United States Patent [19]

Stange et al.

[11] Patent Number: 5,446,989
[45] Date of Patent: Sep. 5, 1995

[54] FLY FISHING ROD HOLDER AND TRANSPORTER

[76] Inventors: Michael C. Stange, 108 Johnycake Mountain Rd., Burlington, Conn. 06013; Thomas J. Delekta, 49 Ginger La., Torrington, Conn. 06790

[21] Appl. No.: 338,436

[22] Filed: Nov. 14, 1994

[51] Int. Cl.⁶ ............................................. A01K 97/10
[52] U.S. Cl. ................................... 43/21.2; D22/147
[58] Field of Search ................. 43/21.2, 15; D22/147; 211/70.8; 224/922

[56] References Cited

U.S. PATENT DOCUMENTS

| | | | |
|---|---|---|---|
| D. 231,525 | 4/1974 | Curtis | D22/147 |
| D. 236,343 | 8/1975 | Polzin | D22/147 |
| 2,861,761 | 11/1958 | Nordell | D22/147 X |
| 4,739,914 | 4/1988 | Pothetes | 224/922 X |

OTHER PUBLICATIONS

Atwood Corporation Inc. 1992 brochure "Fishing Rod Holders and Downriggers" Roberts.
J. M. Roberts Co., Inc. brochure "Roberts #1 with Fishermen Everywhere" Rod Holders & Mini Downriggers.
Tempress Incorporated 1988 brochure "Tempress Fish-On" Innovative Prodcuts 1988-1989; cover page, page 6 and page marked A.

*Primary Examiner*—Mark Rosenbaum
*Assistant Examiner*—Jeanne M. Elpel
*Attorney, Agent, or Firm*—Ira S. Dorman

[57] ABSTRACT

The fishing rod holder has an entrance opening in its front wall portion located intermediate its opposite ends, with slot portions extending longitudinally from the opening in both directions. A supporting element of resiliently deformable material is seated in the upper section of the passageway, and a flexible retaining member is adapted for disengageable securement on the body across the upper slot portion. A fishing rod, with a mounted reel, can be assembled with the holder by inserting its lower end through the entrance opening, sliding the rod downwardly in the passageway while lowering its grip portion toward the supporting element, and thereafter affixing the retaining member in place.

11 Claims, 4 Drawing Sheets

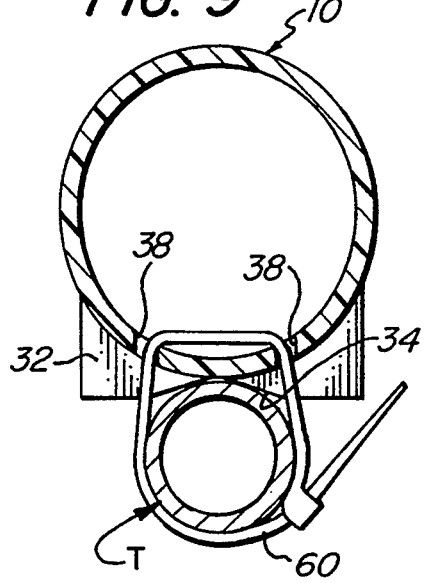
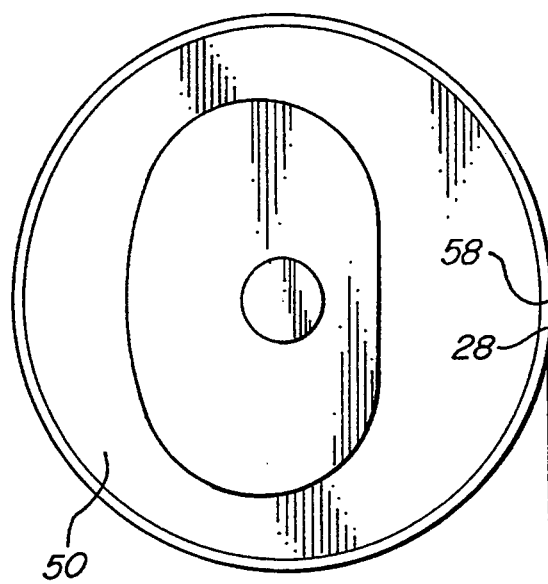
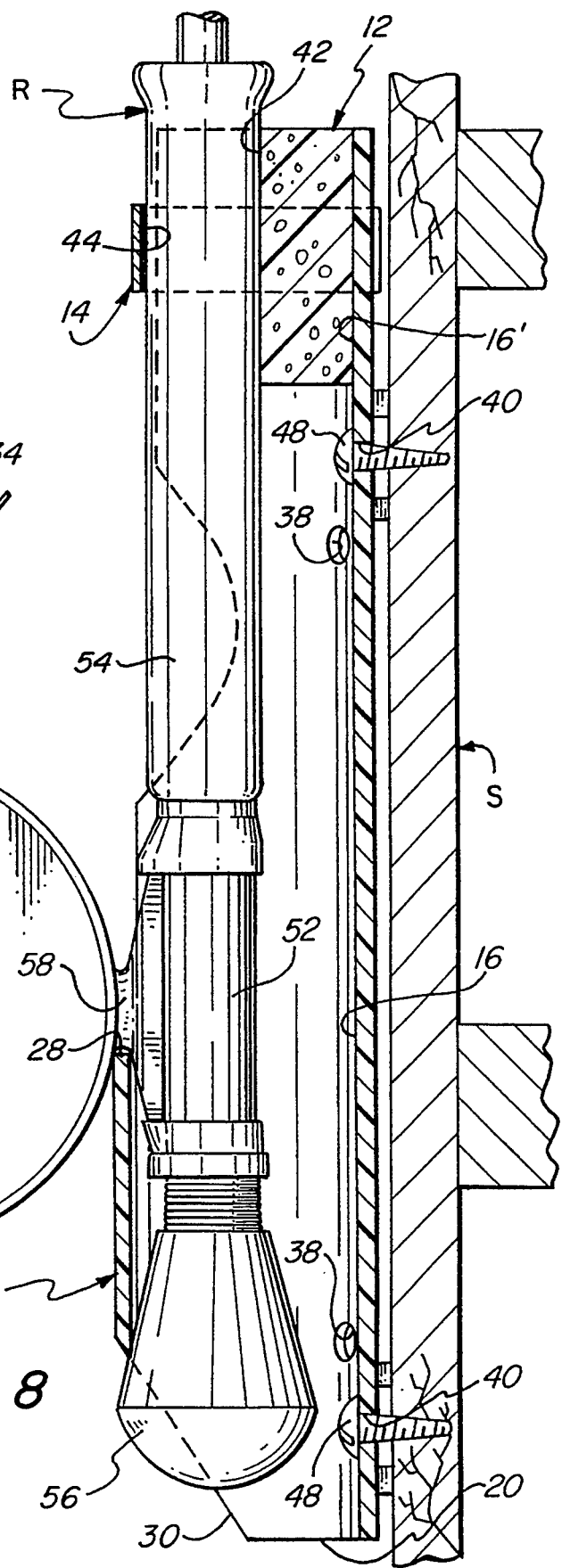
FIG. 9
FIG. 8

FLY FISHING ROD HOLDER AND TRANSPORTER

BACKGROUND OF THE INVENTION

Holders for storing and transporting fishing rods are in widespread use, and are sold commercially. Units available on the market are however deficient in one or more respects, most notably in providing adequate support and security for the stored fishing rod, and in not being well suited for use with particular kinds of rods.

SUMMARY OF THE INVENTION

It is therefore the broad object of the present invention to provide a novel holder for storing and transporting a fishing rod in a safe and highly secure manner.

A more specific object is to provide such an article which is especially adapted to hold and support a fishing rod with a reel attached, and in particular a fly fishing rod, which may be fitted with a butt extension as well.

Further objects of the invention are to provide a holder having the foregoing features and advantages, which is in addition adapted to readily secure the fishing line during storage of a rod, which is of relatively incomplex and inexpensive construction, and which is versatile and convenient to employ.

It has now been found that the foregoing and related objects of the invention are attained by the provision of a fishing rod holder comprised of an elongate, rigid body having a passageway extending from its upper end and along at least a major portion of its length, a supporting element assembled with the body, and an associated flexible retaining member. A front wall portion of the body is formed with an entrance opening to the passageway, at a location intermediate the opposite ends, and with slots that extend longitudinally from the opening in both directions and into the passageway. The upper slot opens at the upper end of the body; the lower slot terminates short of both the lower end of the body and also of the lower end of the passageway, and is narrower than the opening. Normally, the supporting element will be fabricated from a resiliently deformable material. It is seated in the section of the passageway that extends upwardly of the entrance opening, and occupies a rearward portion of the cross section thereof; the retaining member is adapted for disengageable securement on the body, in a spanning relationship over the insert and the upper slot.

The construction described enables the holder to receive and securely support a fishing rod and reel combination. Assembly is effected by inserting the butt portion of the rod through the entrance opening, sliding it downwardly in the passageway while lowering the grip portion toward the supporting element, to engage the reel foot in the lower slot, and thereafter securing the retaining member across the upper slot with the grip portion disposed upon the underlying supporting element.

The entrance opening of the body will desirably be defined by generally V-shaped notches that extend rearwardly along its opposite sides. The body will generally be of tubular form, and preferably substantially cylindrical with the passageway extending along its entire length; it will typically be integrally formed, as a single piece, from a synthetic resinous material.

The insert employed advantageously will comprise a piece of foamed, synthetic resinous material, formed with a channel extending along its entire length and aligned directly under the upper slot of the body. The retaining member will, in preferred embodiments, include the components of a hook-and-loop type fastener, one such component being disposed adjacent one end of a strap and the other component being attached to the holder body or adjacent the opposite end of the strap. Most desirably, the body will be partially foreshortened by an indentation that extends upwardly, from its lower end, in the front wall portion.

BRIEF DESCRIPTION OF THE DRAWINGS

FIG. 8 is a longitudinal sectional view, taken along line 8—8 of FIG. 2, with the holder being shown attached to mounting structure and supporting a fly fishing rod; and FIG. 9 is a transverse sectional view of the holder, taken along line 9—9 of FIG. 2 and depicting the holder attached to a tubular mounting element.

DETAILED DESCRIPTION OF THE ILLUSTRATED EMBODIMENT

Figure 1:
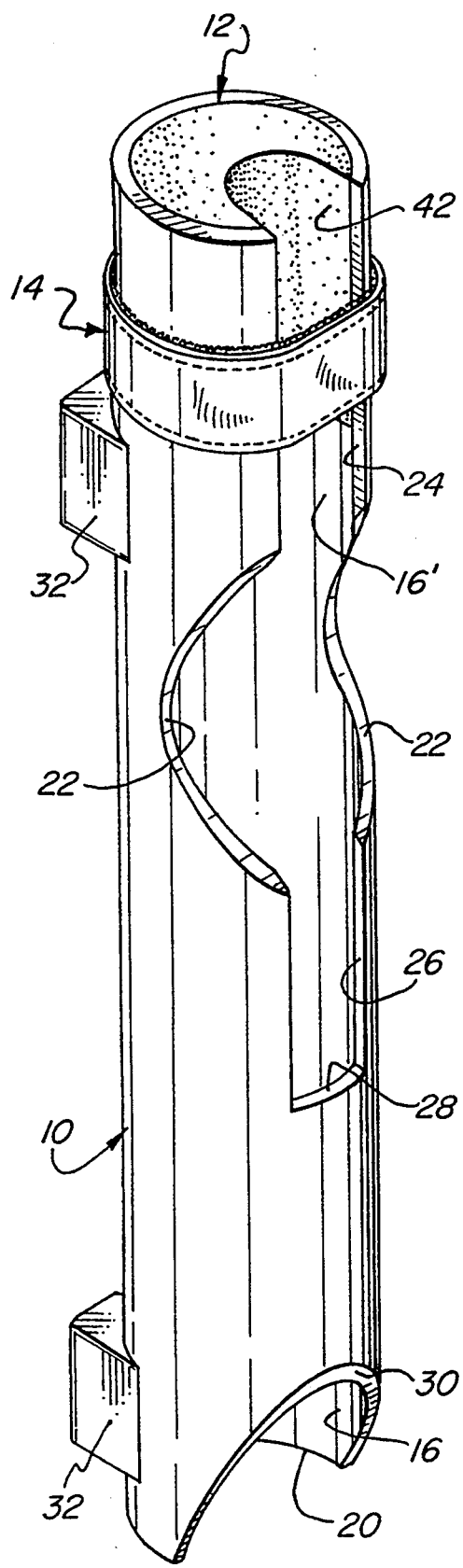
FIG. 1 is a perspective view of a fishing rod holder embodying the present invention.
Figure 2:
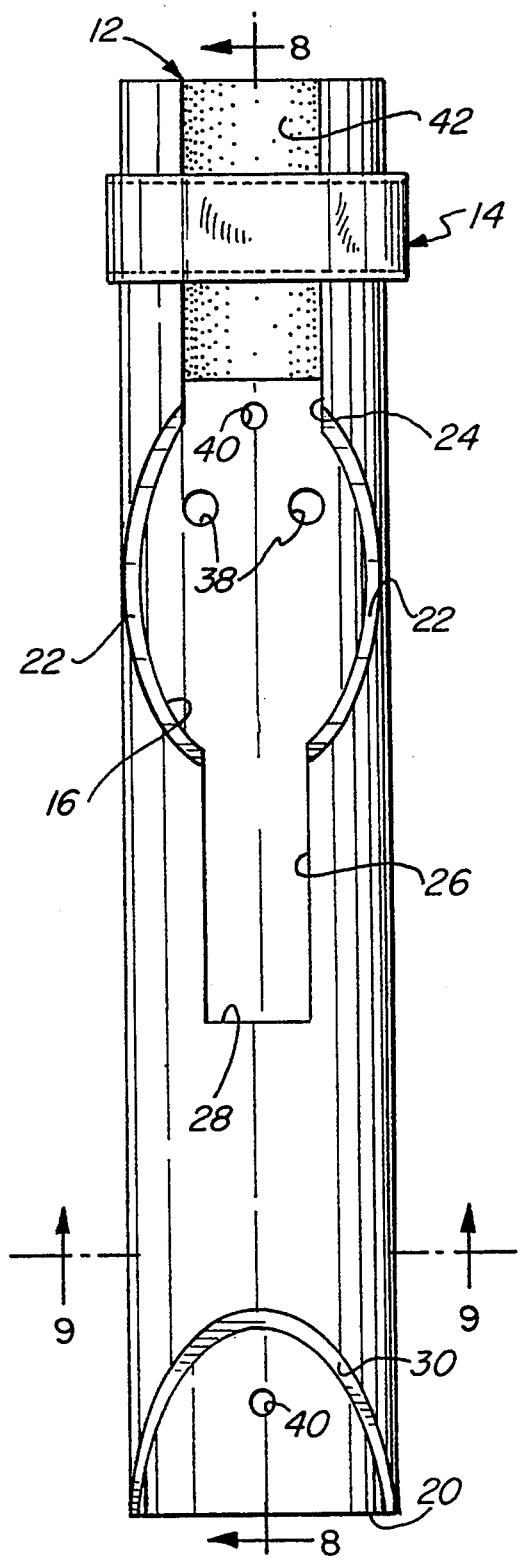
FIGS. 2 through 7 are, respectively, front, side, opposite side, bottom, top, and rear views of the holder depicted in FIG. 1.
Figure 3:
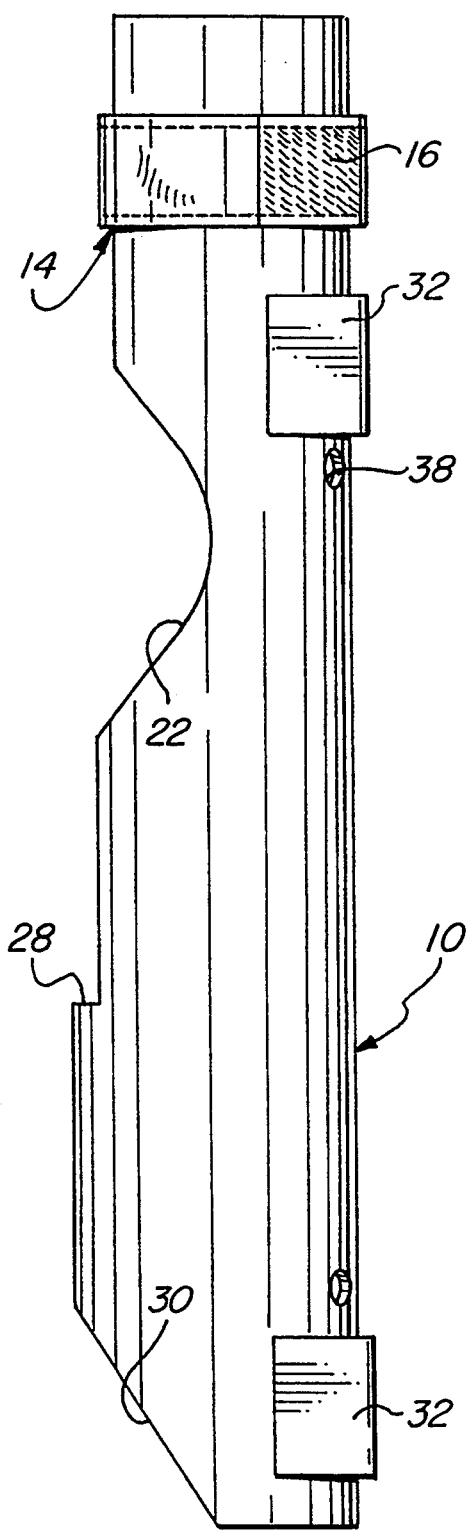
Figure 4:
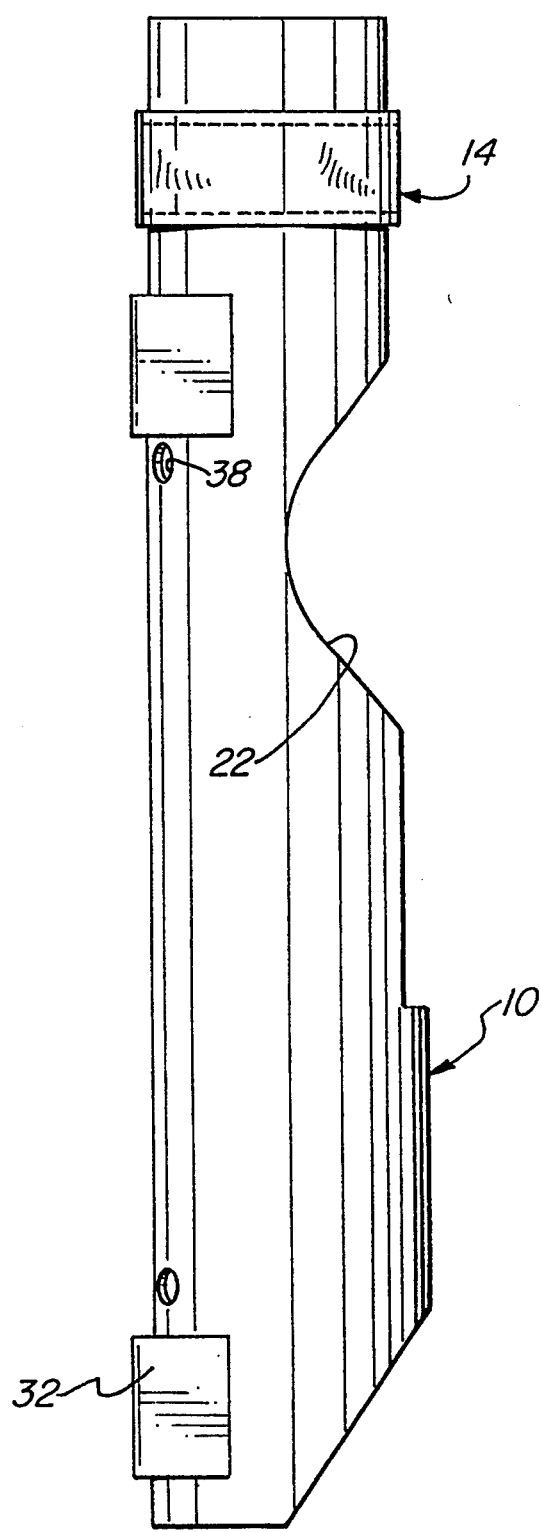
Figure 5:
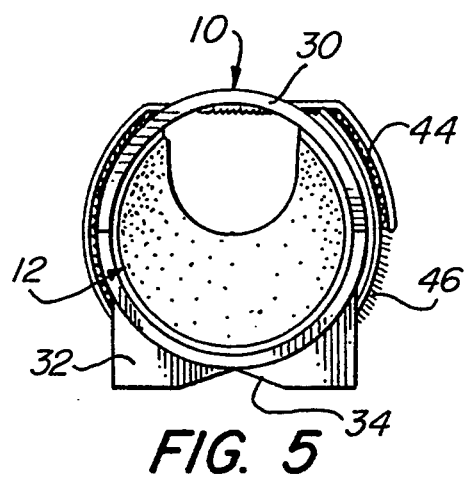
Figure 6:
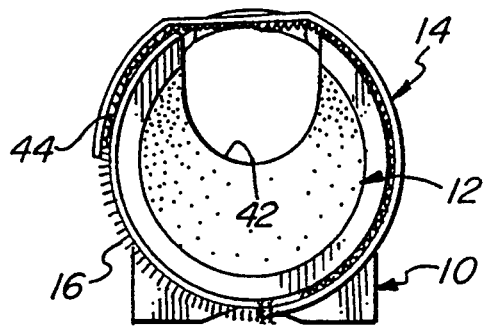
Figure 7:
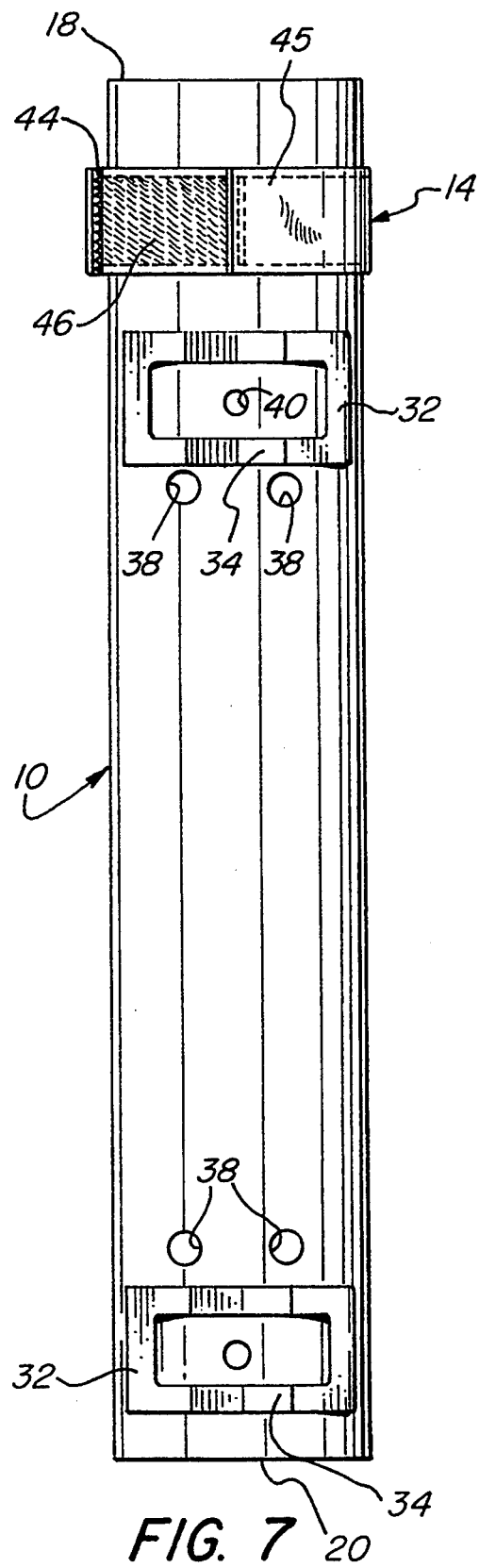

Turning now in detail to the appended drawings, therein illustrated is a holder for storing and transporting a fly fishing rod, comprised of a body generally designated by the numeral 10, a resiliently deformable insert generally designated by the numeral 12, and a retaining strap generally designated by the numeral 14. A passageway 16 extends between the upper and lower ends 18, 20 of the body 10, and a lateral entrance opening to the passageway is formed through a front wall portion; the opening is defined by generally V-shaped notches 22, which extend rearwardly in sidewall portions of the body. An upper slot 24 extends longitudinally from the entrance opening, and opens at the upper end 18 of the body. A lower slot 26 extends longitudinally from the entrance opening in the opposite direction, and terminates in an abutment surface 28, short of the end of the passageway 16 and of the lower end 20 of the body. Indentation 30, formed as a bevel section in a plane oblique to the axis of the holder, extends upwardly in the front wall portion of the body from the lower end 20. Two box-like mounting boss structures 32 project at longitudinally spaced locations from the rear wall portion of the body, and are formed with longitudinally aligned V-shaped notches 34. A pair of relatively large apertures 38 are provided in the rear wall portion adjacent one side of each boss 32, and a relatively small aperture 40 extends therethrough within the confines of the boss-forming wall.

The insert 12 is affixed (e.g., by adhesive bonding) within an upper section 16 of the passageway through the body. A longitudinally extending, U-shaped channel 42 is formed in the insert, and is aligned directly under the upper body slot 24.

The retaining strap 14 carries, on one surface, the elements comprising a component 44 of a hook-an-loop type fastener (i.e., VELCRO); the strap is attached at one end 45 to the body 10. The mating component 46 of the fastener is affixed to the body adjacent the attached end 45, and serves to engage the component 44 when the strap is wrapped about the body 10 in a transverse relationship over the slot 24 and insert channel 42.

As can be seen from FIG. 8, the holder is mounted upon a suitable support "S" by screws 48, inserted through the two smaller apertures 40. Needless to say, the support "S" may itself be a vertical wall, or it may be a separate base (as illustrated) adapted for the attachment of one or more holders, in turn designed for attachment to a wall or other more permanent structure.

The fishing rod "R" is assembled with the holder in such a manner that the reel 50, mounted upon the reel seat 52, is engaged within the lower slot 26 with its foot 58 abutted against the end surface 28, thus constraining the rod against further downward movement as well as movement from side-to-side. In that relationship, the fighting butt 56 protrudes through the indentation 30 and the grip 54 is seated within the channel 42 of the insert 12. It will be appreciated that the need to accommodate the enlarged, fighting butt 56 arises because the rod is supported forward of the centerline of the holder passageway 16. Its elevated relationship also causes the grip 54 to project through and slightly above the slot 24, thus enabling the strap 14 to hold the rod securely by forcing it firmly against the underlying insert 12. It will also be appreciated that the flexible strap 14 provides a convenient means for retaining and controlling the fishing line, which is done simply by laying the line along the grip 54 prior to application of the strap.

FIG. 9 illustrates an alternative means for supporting the holder, utilizing a tubular support element "T." A flexible band 60 (advantageously, a ratchet-acting plastic wire harness) is simply threaded through each set of paired apertures 38 and fastened about the element T.

Materials used for construction of the instant holder will be self evident, and need not therefore be discussed in detail. Suffice to say that the holder body will normally be fabricated from a strong, rigid and durable synthetic resinous material, such as polycarbonate, nylon, or the like, which material may be filled or reinforced if so desired. The insert employed may be made of any material that will support the rod without damaging it, and that will cooperate with the retaining member to substantially immobilize the rod in the holder. Resiliently deformable and semi-rigid foams of synthetic resins, such as polyurethane, may afford optimal properties for this application, albeit that many other natural and synthetic materials may be employed to comparable effect. The flexible retaining member will desirably comprise a strip of nylon webbing to which components of VELCRO are attached, but other materials and constructions may of course be substituted.

It will be appreciated that modifications may be made to the illustrated and described holder without departure from the concept of the invention, as it is herein defined. For example, although a tubular cylindrical body will inherently provide a suitable passageway for receipt of the fishing rod, and will cooperate effectively with a wrapping strap to secure the rod in place, other configurations may be employed, if preferred. Additional changes will undoubtedly occur to those skilled in the art.

Thus, it can be seen that the present invention provides a novel holder for storing and transporting a fishing rod in a safe and highly secure manner. The article is especially adapted to hold and support a rod and reel combination and, in particular, a fly rod which may be fitted with a butt extension (i.e., especially for a saltwater rod) as well. The holder of the invention is in addition adapted to readily secure a fishing line during rod storage, it is of relatively incomplex and inexpensive construction, and it is versatile and convenient to employ.

Having thus described the invention, what is claimed is:

1. A fishing rod holder comprising:

an elongate, rigid body having upper and lower opposite ends with a passageway extending from said upper end along at least a major portion of the length thereof, said body having a front wall portion formed with an entrance opening to said passageway at a location intermediate said opposite ends, and formed with slots extending longitudinally therefrom in both directions and into said passageway, the upper one of slots opening at said upper end of said body and the lower one of said slots terminating short of said lower end of said body and short of the lower end of said passageway, at least said lower slot being narrower than said opening;

a supporting element seated in the section of said passageway that extends upwardly of said entrance opening, and occupying a rearward portion of the transverse cross section of said passageway; and a flexible retaining member adapted for disengageable securement in a spanning relationship over said upper slot portion and said insert; whereby a fishing rod, with a reel mounted thereon and having a grip portion extending upwardly from the reel seat and a butt portion extending downwardly therefrom, can be assembled with said holder by inserting the butt portion through said entrance opening, sliding the rod downwardly in said passageway while lowering the grip portion toward said supporting element, to thereby engage the reel foot in said lower slot portion, and thereafter securing said retaining member across said upper slot portion with the grip portion of the rod supported upon said supporting element.

2. The holder of claim 1 wherein said entrance opening is defined by generally V-shaped notches extending rearwardly along opposite sides of said body, and wherein said upper slot is also narrower than said opening.

3. The holder of claim 1 wherein said body is of tubular form, and wherein said passageway extends entirely through said body.

4. The holder of claim 3 wherein said body is of substantially cylindrical form.

5. The holder of claim 1 wherein said body is integrally formed, as a single piece, from a synthetic resinous material.

6. The holder of claim 1 wherein said insert comprises a piece of resiliently deformable material.

7. The holder of claim 1 wherein said insert has a channel extending along its entire length and aligned directly under said upper slot of said body.

8. The holder of claim 1 wherein said retaining member comprises a strap attached to said body.

9. The holder of claim 8 wherein said retaining member further comprises the mating components of a hook-and-loop type fastener and wherein said strap has opposite ends, one component of said hook-and-loop type fastener being disposed adjacent one of said ends of said strap, and the mating component thereof being effectively disposed adjacent the opposite end of said strap.

10. The holder of claim 1 wherein said body is partially foreshortened by an indentation extending upwardly from said lower end in said front wall portion.

11. The holder of claim 1 wherein said body is additionally provided with means for attaching said holder on mounting structure.

* * * * *